United States Patent [19]

Ukita et al.

[11] Patent Number: 5,257,186
[45] Date of Patent: Oct. 26, 1993

[54] DIGITAL COMPUTING APPARATUS FOR PREPARING DOCUMENT TEXT

[75] Inventors: Teruhiko Ukita; Kazuo Sumita; Satoshi Kinoshita, all of Tokyo, Japan

[73] Assignee: Kabushiki Kaisha Toshiba, Tokyo, Japan

[21] Appl. No.: 702,809

[22] Filed: May 21, 1991

[30] Foreign Application Priority Data

May 21, 1990 [JP] Japan .................. 2-129226

[51] Int. Cl.$^5$ .............................. G06F 15/38
[52] U.S. Cl. .................................. 364/419.1
[58] Field of Search ............... 364/419, 900 MS File; 382/56

[56] References Cited

U.S. PATENT DOCUMENTS

| | | | |
|---|---|---|---|
| 4,554,631 | 11/1985 | Reddington | 364/300 |
| 4,813,010 | 3/1989 | Okamoto et al. | 364/900 |
| 4,876,655 | 10/1989 | Iwai et al. | 364/900 |
| 4,955,066 | 9/1990 | Notenboom | 382/56 |
| 4,996,665 | 2/1991 | Nomura | 364/900 |
| 5,077,668 | 12/1991 | Doi | 364/419 |

FOREIGN PATENT DOCUMENTS

2-44462 2/1990 Japan .

*Primary Examiner*—Roy N. Envall, Jr.
*Assistant Examiner*—Frantzy Poinvil
*Attorney, Agent, or Firm*—Finnegan, Henderson, Farabow, Garrett & Dunner

[57] ABSTRACT

A digital computing apparatus for preparing document text includes a sentence significance decision section for calculating a significance value of each sentence of document data according to a relation between each sentence and other sentences of the document data. The apparatus can also include a topic extraction section for extracting a topic for each sentence of the document data. A format structure extraction section extracts format structure from document data according to predetermined rules. The format structure, corresponding sentence significance values and topics are sent to an output section. The output section displays this information to the user. The sentence retrieval section retrieves sentences including a user inputted reference word from document data. Then the sentence retrieval section selects a sentence which is related to the reference word from retrieved sentences according to the sentence significance value or the topic. The output section displays only the selected sentence to user.

26 Claims, 10 Drawing Sheets

| CONNECTOR | FUNCTION VALUE |
|---|---|
| BUT | +0.5 |
| THEREFORE | +0.5 |
| IN SHORT | +0.5 (SUCCEEDING SENTENCE IS LONG) <br> −0.5 (PRECEEDING SENTENCE IS LONG) |
| FOR EXAMPLE | −0.7 |
| BECAUSE | −0.3 |
| ON THE OTHER HAND | 0.0 |
| (NO CONNECTOR) | −0.5 |

1. Considering human language activity, we can find that we talk not only about objects and events in a real world but also about those in an imaginary world.

2. So a machine system should process utterances based on conditional sentences.

3. For this point, we think the problem can be solved by utilizing 'context worlds'.

4. For example, in processing a conditional sentence, the system has only to create a new context world and process the following sentences in this world.

5. At the same time, it should be noted that the context world which corresponds to the imaginary world per se differs from the one which is created for context understanding, but can be processed in the same framework.

*Fig.6A*

TOPIC
"CONTEXT WORLD"
(SENTENCE 3,4,5)

*Fig.6B*

| sentences: | 1 | 2 | 3 | 4 | 5 |
|---|---|---|---|---|---|
| connector: | | (so) | (for this point) | (for example) | (at the same time) |
| f: | | 0.5 | 0.5 | −0.7 | 0.0 |
| importance | | | | | |
| initial: | 1.0 | 1.0 | 1.0 | 1.0 | 1.0 |
| 1st cal. | 1.0 | 1.5 | 1.5 | 0.3 | 1.0 |
| 2nd cal. | 1.0 | 2.0 | 2.25 | −0.75 | 1.0 |

TITLE TABLE

| — TITLE | POSITION |
|---|---|
| USAGE USER COMMANDS | 5 |

CHAPTER TABLE

| CHAPTER TITLE | ORDER | POINTER TO SECTION TABLE | POSITION |
|---|---|---|---|
| USER COMMANDS | 1 | — | 35 |
| HOW TO USE COMMANDS | 2 | — | 661 |
| | | | |

SECTION TABLE

| SECTION TITLE | ORDER | POINTER TO CHAP. | POINTER TO SIG. | POINTER TO TOP. | POSITION |
|---|---|---|---|---|---|
| --- | --- | --- | --- | --- | --- |
| COPY | 1 | — | — | — | 675 |
| DELETION | 2 | — | — | — | 900 |
| | | | | | |

SIGNIFICANCE VALUE TABLE

| POINTER TO SECTION TABLE | SENTENCE NUMBER | SIGNIFICANCE VALUE | POSITION |
|---|---|---|---|
| --- | --- | --- | --- |
| — | 1 | 1.0 | 690 |
| — | 2 | 0.5 | 705 |
| | | | |

TOPIC TABLE

| TOPIC | POINTER TO SECTION TABLE | SENTENCE NUMBER | POSITION |
|---|---|---|---|
| --- | --- | --- | --- |
| FILE | — | 1, 2 | 690, 705 |
| | | | |

DIGITAL COMPUTING APPARATUS FOR PREPARING DOCUMENT TEXT

BACKGROUND OF THE INVENTION

1. Field of the Invention

The present invention relates in general to digital computing apparatus for preparing document text and, more particularly, for extracting format structure information and retrieving sentences from document data.

2. Description of the Background

Document processing systems as known in the art, e.g., word processors, are used for creating documents.

However, in cases where a user creates a document consisting of several pages, or a document having a large volume, e.g., a manual, it is difficult for the user to view the entire construction of the document while it is being created. As a result, disadvantageously, the user may unwittingly include the same document data in more than one location in the document, or delete document data i the belief it is included elsewhere in the document.

Figure 1:
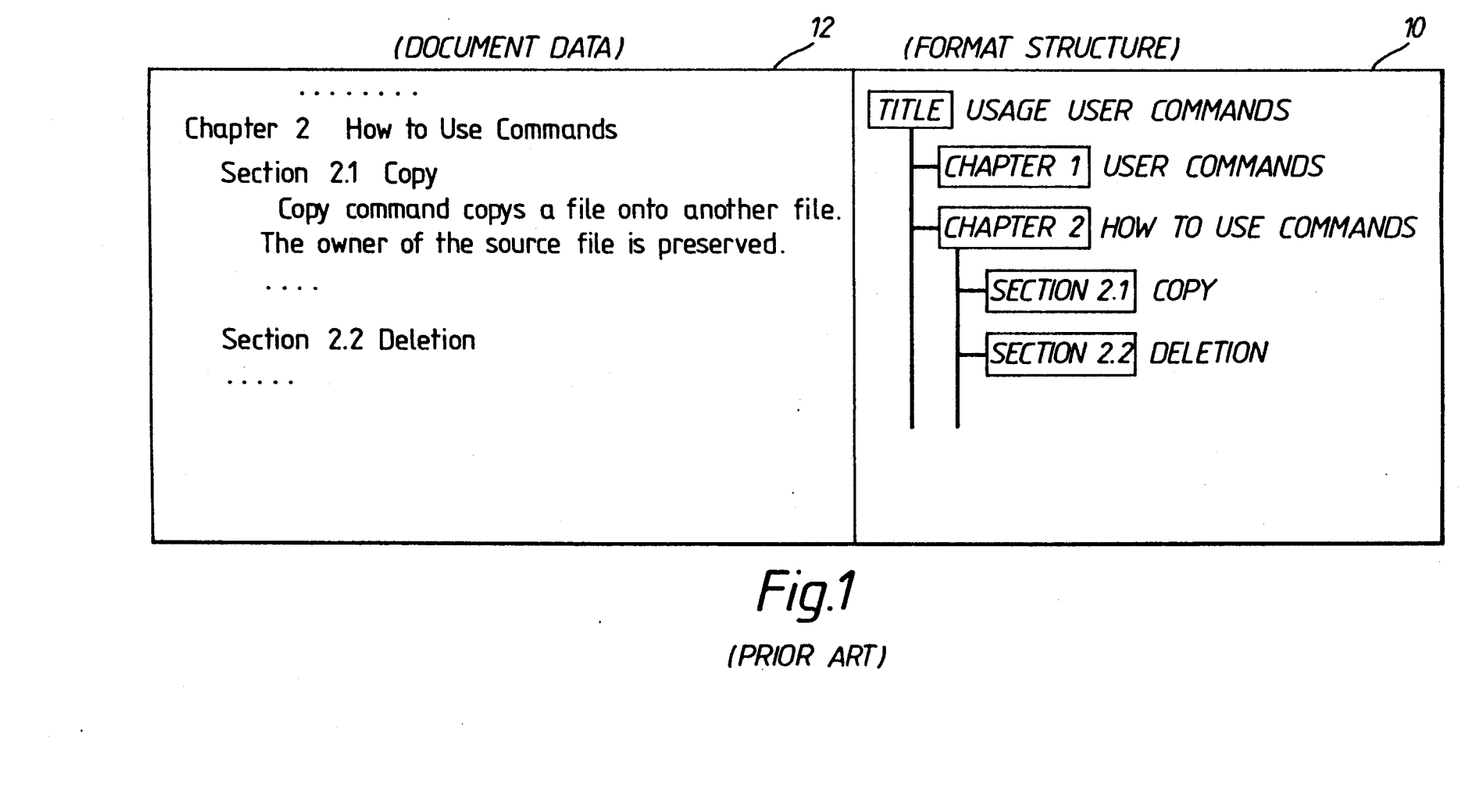
FIG. 1 shows a screen display of a format structure according to the prior art.

One prior art technique employed in an effort to overcome these difficulties consists of displaying the structure of the created document while it is being created. More specifically, a format structure of the document consisting of the document title, chapter titles and section titles to the extent created is displayed. FIG. 1 shows a screen display of a format structure embodying the prior art technique. As shown in FIG. 1, window 10 is generated to display the format information of the created document, while window 12 displays a portion of the created document. In FIG. 1, it is assumed that the user has only completed the document through section 2.1 and is now in the process of preparing section 2.2 of chapter 2. Accordingly, window 10 displays the title of the document, the titles of chapters 1 and 2, and the titles of section 2.1 and 2.2 of chapter 2 as format structure information. However, the displayed format structure information is inherently limited to showing only superficial characteristics of the created document and does not show the content of the created document itself. Therefore, even if the user studies the format structure information, he is still not provided with any detailed information regarding the content of the created document. As a result, the user must directly access and search the text of the created document in order to obtain detailed information about the document. Searching the text of the created document can be time consuming and frustrating for the user.

Also, during the creation of a document, the user may wish to refer back to one or more particular sentences in the portion of the document already created. To facilitate this effort, the user may designate a reference word and request retrieval of sentences including the reference word. However, in accordance with prior art document processing systems, every sentence including a word which coincides with the reference word is retrieved. Therefore, it is likely that sentences will be retrieved that include the reference word but that are not the particular sentence or sentences sought by the user. Therefore, prior art document processing systems do not enable a user to retrieve only sentences having a content of particular interest to the user.

SUMMARY OF THE INVENTION

It is an object of the present invention to provide digital computing apparatus for preparing document text that is not subject to the aforementioned problems and disadvantages of the prior art.

These and other objects of the present invention are accomplished by a digital computing apparatus for preparing document text from document data input by a user, the document text including a series of sentences. The apparatus comprises means for preparing document text from the document data input by the user; and sentence significance means for determining a significance value of each sentence of the series of sentences of the document text, according to a function of a determined relation between each sentence and the immediately preceding sentence in the series of sentences. In addition or alternatively to the sentence significance means, the apparatus can include topic determining means for determining a topic of each sentence in the series of sentences of the document text.

Additional objects and advantages of the invention will be set forth in part in the description which follows, and in part will be obvious from the description, or may be learned by the practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 2:
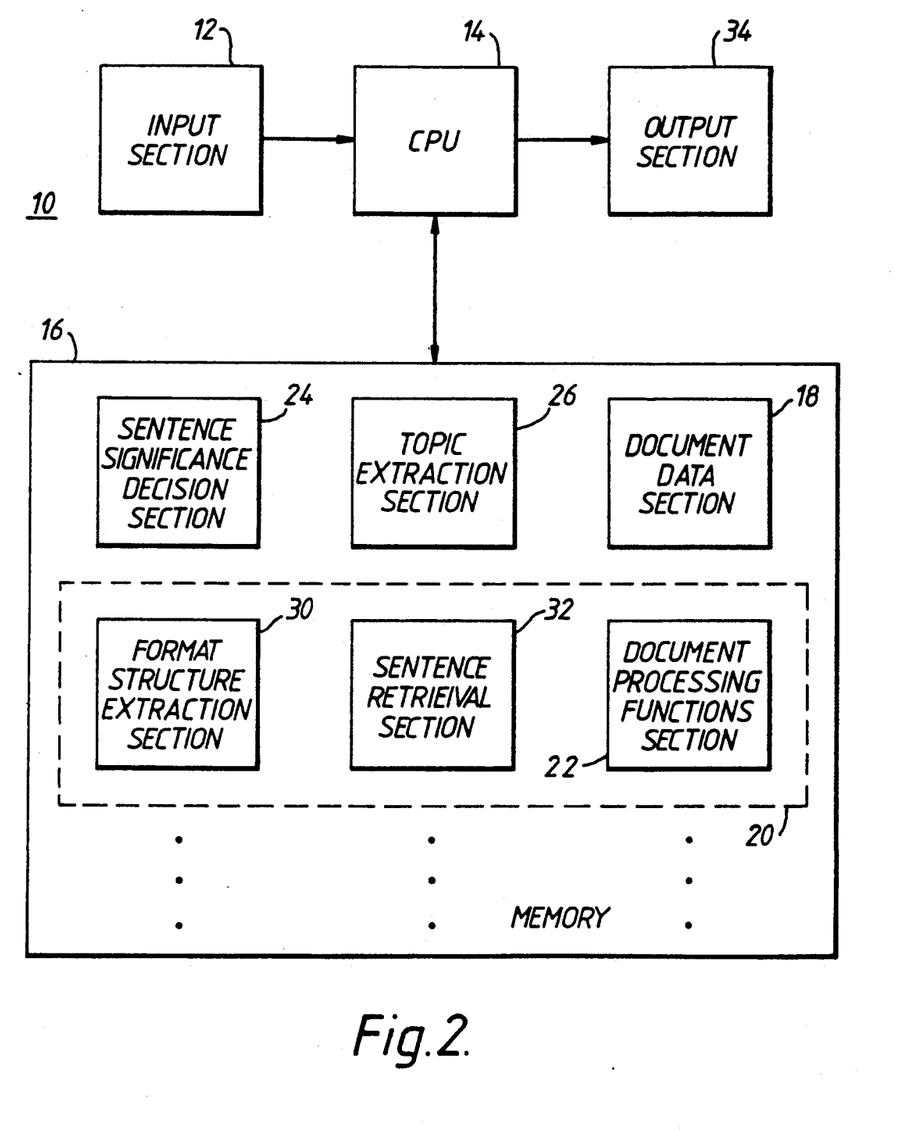
FIG. 2 shows a block diagram of a digital computing apparatus according to an embodiment of the present invention.

Referring now to the drawings, FIG. 2 shows a block diagram of digital computing apparatus 10 according to an embodiment of the present invention. Apparatus 10 includes an input section 12 through which a user can input document data, including editing commands, to apparatus 10. Apparatus 10 also includes a central processing unit (CPU) 14 that is coupled to input section 12 to receive data inputted by the user. Generally, CPU 14 functions to control substantially all functions performed by the elements of apparatus 10.

Apparatus 10 further includes a memory 16 for storing information including program instructions for execution by CPU 14 and document data produced during document processing operations by a user. For illustrative purposes, various types of information stored in memory 16 are illustrated in block diagram form in FIG. 2. Thus, memory 16 includes a document data section 18 for storing document data produced during document processing operations and a document processing section 20 that includes a document processing functions section 22 for storing program instructions, for execution by CPU 14, for performing conventional document processing operations. Memory 16 also includes a sentence significance decision section 24 and a topic extraction section 26 that each contain program instructions for execution by CPU 14 for performing document support processing functions in accordance with the present invention. Document processing section 20 of memory 16 further includes a format structure extraction section 30 and a sentence retrieval section 32 that each contain program instructions for execution by CPU 14 for performing document support processing functions in accordance with the present invention.

Apparatus 10 further includes an output section 34, coupled to CPU 14, for displaying to the user the document being created as well as related information provided in accordance with the present invention. Output section 34 can comprise a display device.

An overview of the interaction of the elements of apparatus 10 is provided next.

To simplify the description of the present embodiment, the functions corresponding to the program instructions stored in sections 22, 24, 26, 30 and 32 will generally be referred to hereafter as though performed by a particular one of these sections of memory 16, it being understood by those skilled in the art that such functions are actually performed by CPU 14 executing the program instructions stored in the particular section of memory 16.

First, document data is supplied by the user to apparatus 10 through input section 12. As used herein, document data refers to data corresponding to the text of the document being created by the user, such document data being stored in document data section 18 of memory 16. The document data is processed by sentence significance decision section 24, topic extraction section 26 and document processing section 20. Sentence significance decision section 24 calculates a significance value of each sentence of the document data according to the nature of the connective relations between successive sentences. Section 24 repeats the calculation of significance values for all sentences of the document data several times. Topic extraction section 26 determines and extracts a topic from each sentence of the document data by techniques including morphological analysis, noun word extraction, frequent noun extraction, and unnecessary word deletion. The calculated significance values and extracted topics, which are associated with particular sentences by the use of sentence numbers that uniquely identify sentences, are subsequently processed by document processing section 20.

Within document processing section 20, format structure extraction section 30 and sentence retrieval section 32 respectively receive the calculated significance values and the extracted topics. Sections 30 and 32 also access the document data stored in document data section 18, as required. Format structure extraction section 30 extracts from the document data, format structure information such as the document title, chapter titles and section titles according to predetermined rules. Then section 30 correlates the format structure information with the corresponding calculated significance values and extracted topics according to sentence number, and sends the results of this correlation to control section 14.

Sentence retrieval section 32 retrieves sentences from the document data according to a reference word which is supplied by the user through input section 12. Section 32 then selects sentences from among the retrieved sentences according to the calculated significance value and the extracted topic for each sentence. Then section 32 sends the selected sentences as the final retrieval result to CPU 14.

CPU 14 causes the processing results from format structure extraction section 30 and sentence retrieval section 32 to be transmitted to output section 34 for display to the user.

Next, the elements of document processing apparatus 10 are described in greater detail. Input section 12 can be provided as a conventional keyboard for the user to input document data and editing commands. In accordance with the illustrated embodiment of the invention, when a user supplies document data, he can also designate support processing, i.e., format structure extraction or sentence retrieval, through input section 12. When the user designates the format structure extraction support processing, format structure extraction section 30 is activated. When the user designates the sentence retrieval support processing, sentence retrieval section 32 is activated.

Sentence significance decision section 24 extracts "connectors" that connect successive sentences of the document data. As used herein, the terms "first" and "second" refer to the order in which a pair of successive sentences are encountered in the text of the document being created. Section 24 calculates a significance value for each sentence according to a function value of the extracted connectors. For example, two sentences are considered to be connected by the connector "therefore", when the second sentence begins with the word "Therefore". In such a case, the second sentence is considered to express a conclusion to the first sentence. Accordingly, the second sentence is determined to be the more important of the two sentences. This type of processing is repeated in sequence for each successive pair of sentences in the document data from the first sentence of the document data to the last sentence.

Figure 3:
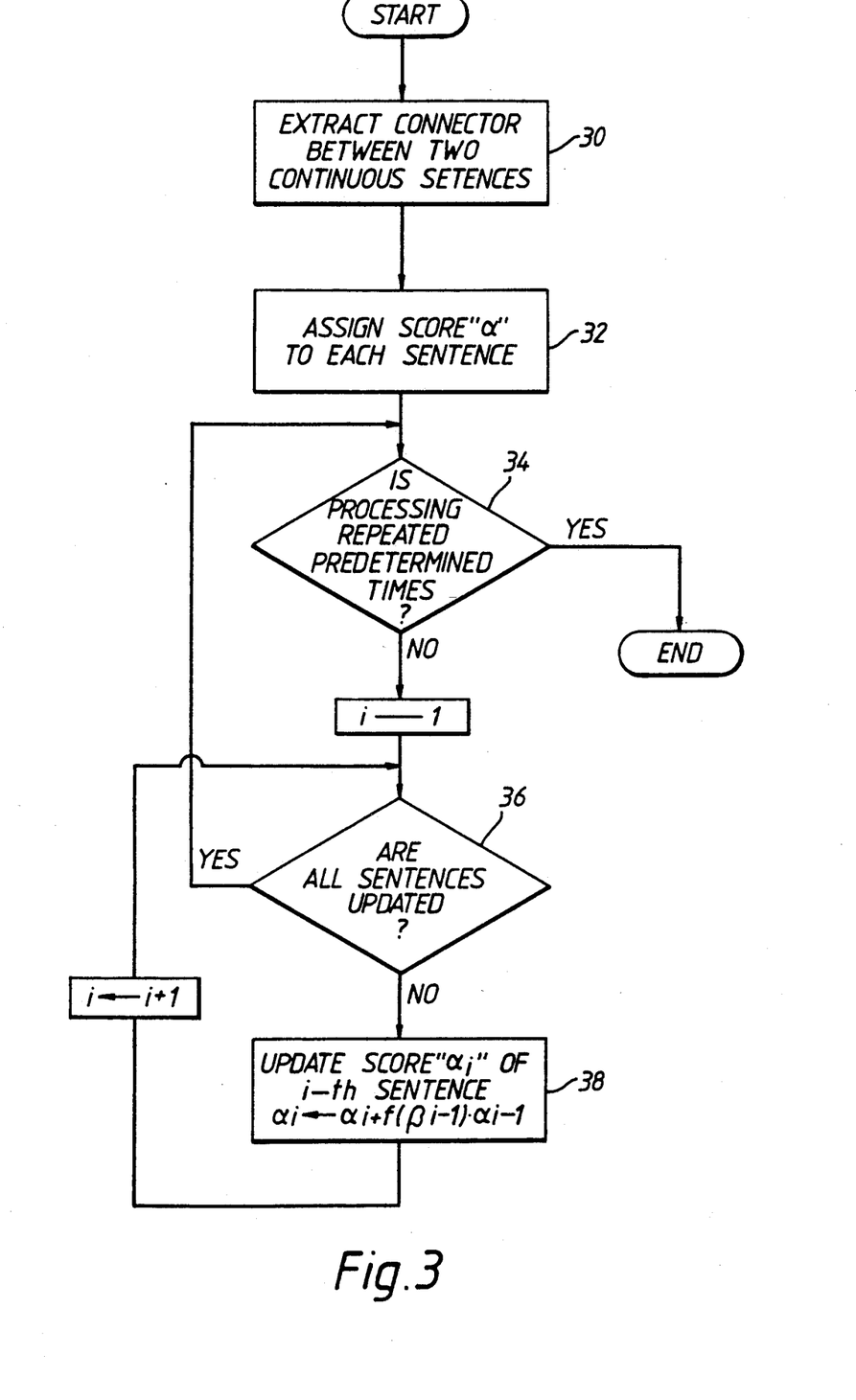
FIG. 3 shows a flow chart for calculating significance values of sentences according to an embodiment of the present invention.

FIG. 3 shows a flow chart for calculating the significance value of a sentence in the document data according to an embodiment of the present invention. First, section 24 extracts the "connector" between two successive sentences of document data (step 30). For the purpose of explanation only, it is assumed that "$\beta$" is the connector occurring between sentence "i" and sentence "i−1". In short, the sentence "i" begins with the connector "$\beta i$". In the case that no connector can be identified between two successive sentences, the second sentence is concluded to merely develop the idea contained in the first sentence. In that case, the first sentence is assumed to be more important than the second sentence.

Still referring to FIG. 3, a significance score "$\alpha$" is assigned to each sentence as an initial significance score (step 32). For example, a score of 1.0 can be assigned as an initial score of each sentence. With respect to all sentences in the document data, the processing described next is repeated at predetermined times. For example, these steps can be repeated each time a predetermined number of sentences, e.g., five, is added to the document data, or each time the user causes the most recently entered document data to be stored. For the purpose of explanation, "$\alpha i$" is the significance score of the i-th sentence of document data. The significance score "$\alpha i$" is updated in accordance with equation (1), below, as a function of the score of the (i−1)th sentence and the connector between the (i−1)th and i-th sentences as follows:

$$\alpha i \leftarrow \alpha i + f(\beta_i) \cdot \alpha_{i-1} \qquad (1)$$

Figure 4:
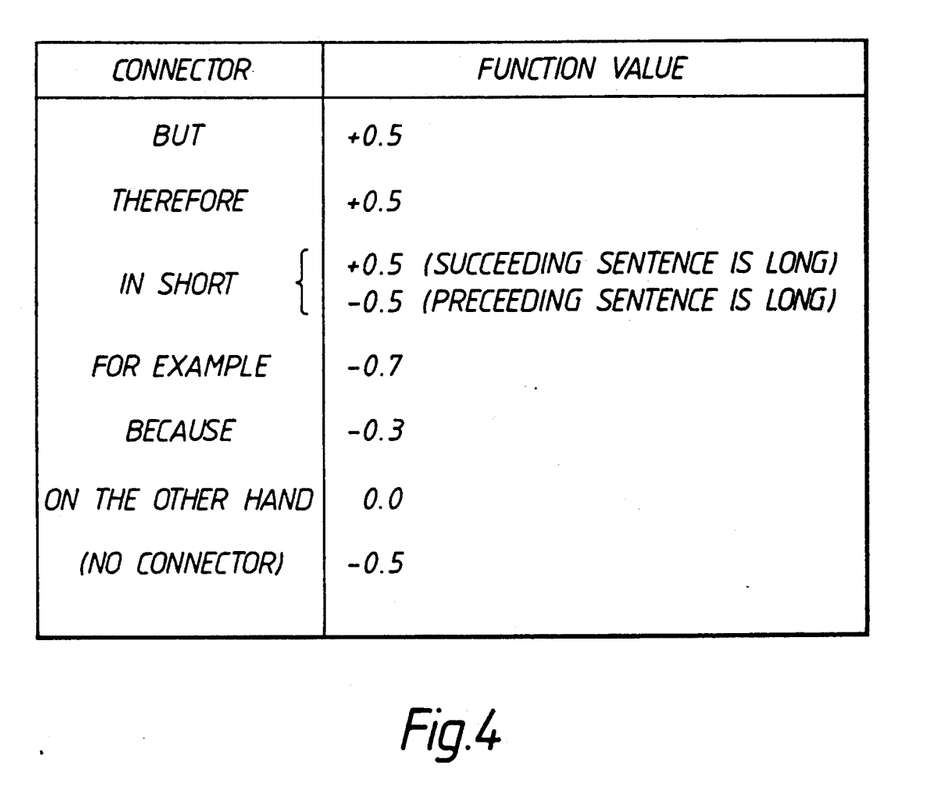
FIG. 4 shows a table of sentence connectors and function values used in the flow chart shown in FIG. 3.

Equation (1) embodies steps 34, 36 and 38 of the flowchart in FIG. 3. In equation (1), $f(\beta_{i-1})$ is a predetermined function value for the connector "$\beta_i$". FIG. 4 is an exemplary table listing function values for a list of connectors. By using the function value of the connector, the score of the first sentence is reflected in the score of the second sentence.

Alternatively and preferably, equation (2) may be used to compute the significance score of a sentence so that it reflects the significance scores of the preceding and following sentences:

$$\alpha i \leftarrow \alpha i + f(\beta_i) \cdot \alpha_{i-1} + f(\beta_{i+1}) \cdot \alpha_{i+1} \qquad (2)$$

In accordance with a preferred embodiment of the invention, updating of the score using one or the other of equations (1) and (2) is repeated at least two times for all sentences of the document data. As a result, the significance value of each sentence is determined.

When updating of the score is repeated for all sentences, it happens that the score values of the sentences may vary widely. It is therefore preferred that the score values be normalized according to equation (3) below formula, upon completion of the updating of the score values of the sentences.

$$\alpha i \leftarrow \alpha i \div \sum_{i=1}^{n} \alpha_i \quad (n: \text{number of all sentences}) \qquad (3)$$

The repetition of the updating of the respective scores several times is performed to assure that the score of each sentence is reflected in all other sentences. It is for this reason that the updating of the scores is repeated at least two times (step 34 in FIG. 3).

Figure 5:
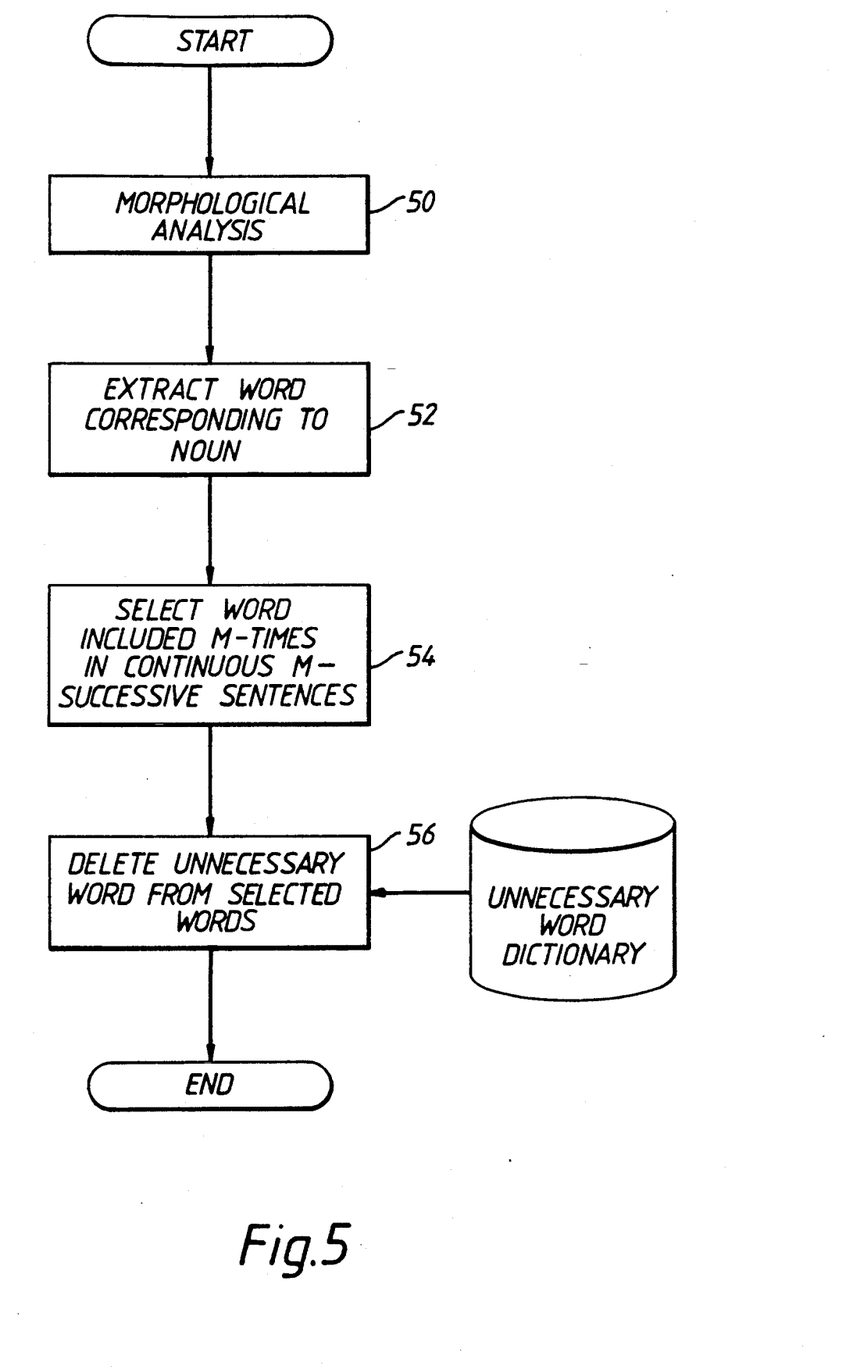
FIG. 5 shows a flow chart for extracting a topic from sentences of document data according to an embodiment of the present invention.

Next, the processing performed by topic extraction section 26 is explained. FIG. 5 shows a flow chart for extracting the topic from a sentence in document data according to an embodiment of the present invention. Section 26 performs a morphological analysis of the words of each sentence of document data by identifying a part of speech of each word of each sentence (step 50 in FIG. 5). The following example sentence is used to illustrate the functions performed by section 26:

"For this point, we think the problem can be solved by utilizing context worlds."

Section 26 performs a morphological analysis the morphemes of the example sentence as follows:

"For (prep.)+this (pron.)+point (n.), we (pron.)+think (v.)+the (def. art.)+problem (n.)+can (aux.v.)+be (v.)+solved (v.)+by (prep.)+utilizing (v.)+context (n.)+worlds (n.)."

Section 26 extracts all words corresponding to nouns except for pronouns (step 52 in FIG. 5). In this example, the nouns "point", "problem", "context" "worlds" are extracted. Then section 26 selects from the words corresponding to nouns each word which is included m-times ($2 \leq m \leq 5$) in n continuous successive sentences ($1 \leq n \leq 10$) (step 54). In this example, it is assumed that the words "point", "context", "worlds" are included in both of two successive sentences. Section 26 selects these words. Thus, in this example, n is 2 since two sentences are considered and m is 2 for each of the selected words.

Then section 26 deletes unnecessary words from selected words by referring to an unnecessary word dictionary (step 56). As used herein, unnecessary words are generic words, e.g., "case", "point", etc. Therefore, in the present example, the word "point" is deleted. Accordingly, section 26 decides that the words "context" and "worlds" are the topic. It is noted that at step 54 in FIG. 5, a definite article, i.e. the, that, those, etc., accompanying a selected word may also be selected even if the word is included in only one sentence.

Figure 6A:
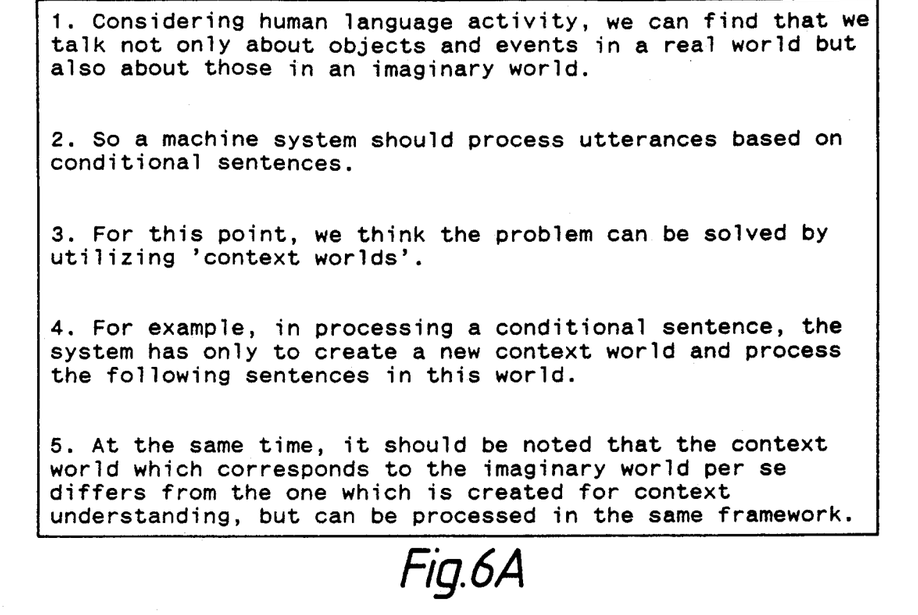
FIG. 6A shows an example of document data.
Figure 6B:
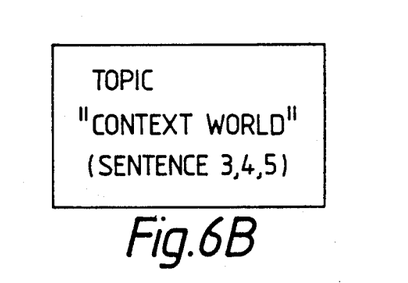
FIG. 6B shows a topic extracted from the document data shown in FIG. 6A.
Figure 6C:
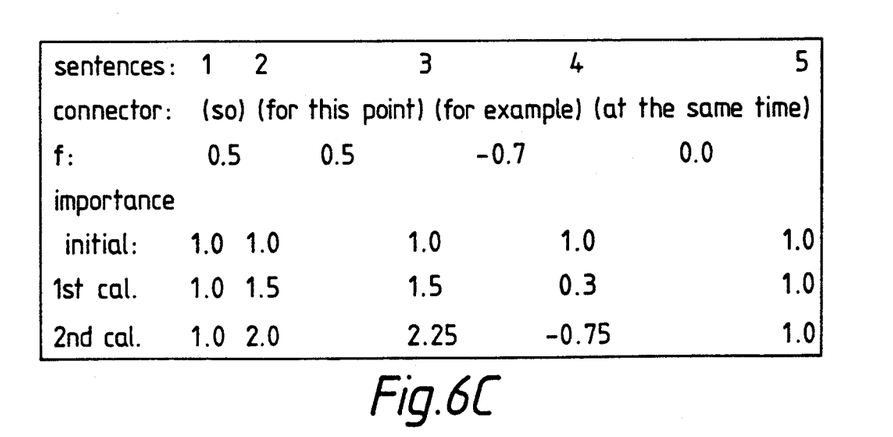
FIG. 6C shows significance values computed for each sentence of the document data shown in FIG. 6A.

FIGS. 6A, 6B and 6C show examples of document data, a sentence topic, and significance values of sentences, respectively. It is assumed that the document data shown in FIG. 6A has already been entered by the user. Topic extraction section 26 extracts the topic shown in FIG. 6B from the document data. In this example, the nouns "context world" are included in sentences 3, 4, and 5, and the nouns "context world" are not contained in the unnecessary word dictionary. Therefore, section 26 extracts the nouns "context world" as a topic. Sentence significance decision section 24 calculates the respective significance values of the five sentences of the document data two-times as shown in FIG. 6C. The connectors "So" in sentence 2, "For this point" in sentence 3, "For example" in sentence 4 and "At the same time" in sentence 5 are extracted. Section 24 assigns an initial value "1.0" to each of the five sentences. Then section 24 calculates a first significance value of each sentence by using the initial value and the function value corresponding to the appropriate connector, as shown in FIG. 4. In the same way, section 26 calculates a second significance value for each sentence. As shown in FIG. 6C, the significance value of "2.25" for sentence 3 is highest among those of the five sentences. Therefore, sentence 3 is the most important in the document data shown in FIG. 6A.

Next, the processing performed by each of format structure extraction section 30 and sentence retrieval section 32 is explained. These sections are activated by designation by the user through input section 12. The format structure extraction section 30 extracts format structure from the created document data according to a predetermined extraction rule. A suitable method for extracting the format structure of a technical document is disclosed in U.S. Pat. No. 4,813,010, which is incorporated in its entirety herein by reference. A brief description of the extraction method disclosed in that patent is described next.

The term "format structure" refers to document title, chapter titles and section titles. The document title is usually located as the first sentence of the document. Therefore, according to that rule, the title is extracted. Each chapter title is typically located with a number in one sentence. Therefore, based on the resulting numeric pattern, each chapter title is extracted. For example, three typical numeric patterns for chapter titles are illustrated as follows, wherein "N" is an integer and the symbols a,b,c are free characters:

Chapter N. abc
N. abc
[N] abc

From the character string corresponding to the above-noted numeric pattern, the chapter title "abc" is extracted. The section title is usually located below the chapter title. The first character position of the section title is usually located to the right relative to the first character position of the chapter title. Further, the section title is usually located with a number in one sentence. Therefore, according to a numeric pattern similar to that noted above for extracting the chapter title, the section title is extracted. Each sentence of text is located below the section title and does not include a numeric pattern. Therefore, by detecting the "period" punctuation occurring at the end of each sentence, each sentence is extracted.

Figure 7:
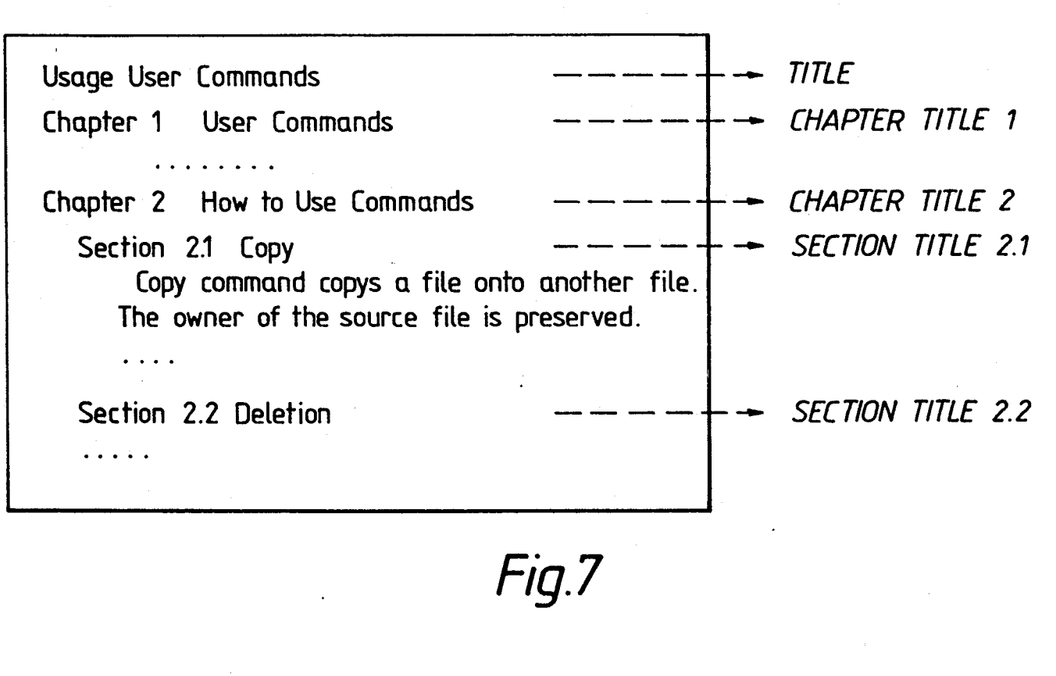
FIG. 7 shows document format structure information.

FIG. 7 shows an exemplary format structure of document data. In the illustrated example, the document title, chapter titles 1 and 2, section titles 2.1 and 2.2 are extracted as format structure. Section titles 2.1 and 2.2 belong to chapter 2.

Figure 8:
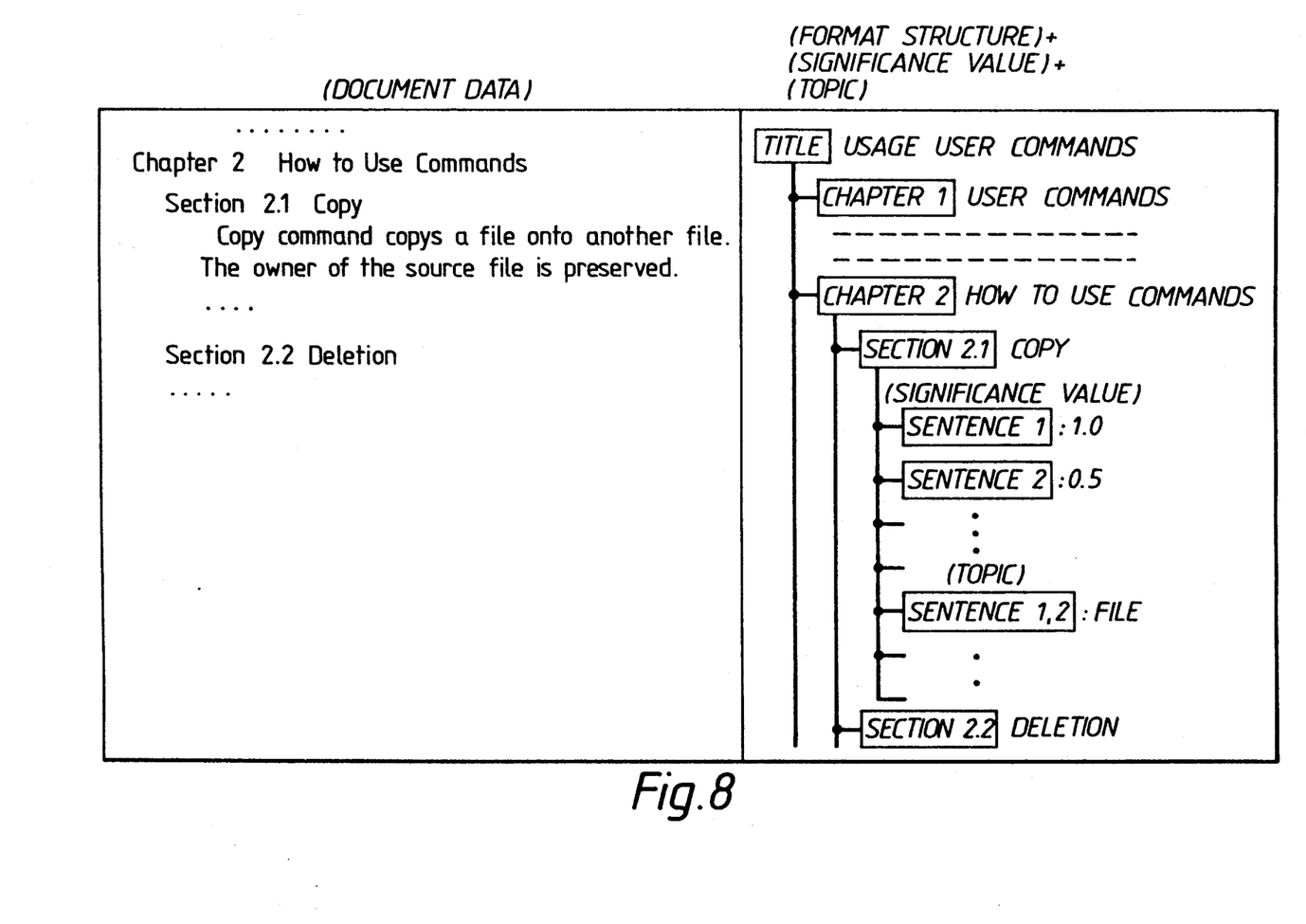
FIG. 8 shows a screen display of document format structure, sentence significance values and topics corresponding to document data, according to an embodiment of the present invention.

In the illustrated embodiment of the present invention, the significance value and topic corresponding to the format structure are displayed to the user in a window as shown in FIG. 8. As described above, the format structure extraction section 30 (FIG. 2) receives the previously computed significance value and topic corresponding to each sentence number. After the format structure is extracted by format structure extraction section 30, CPU 14 causes the format structure, significance value and topic, which correspond to sentence numbers, to be transmitted to output section 34 for display to the user, an example of the display of such information being shown in FIG. 8.

Figure 9:
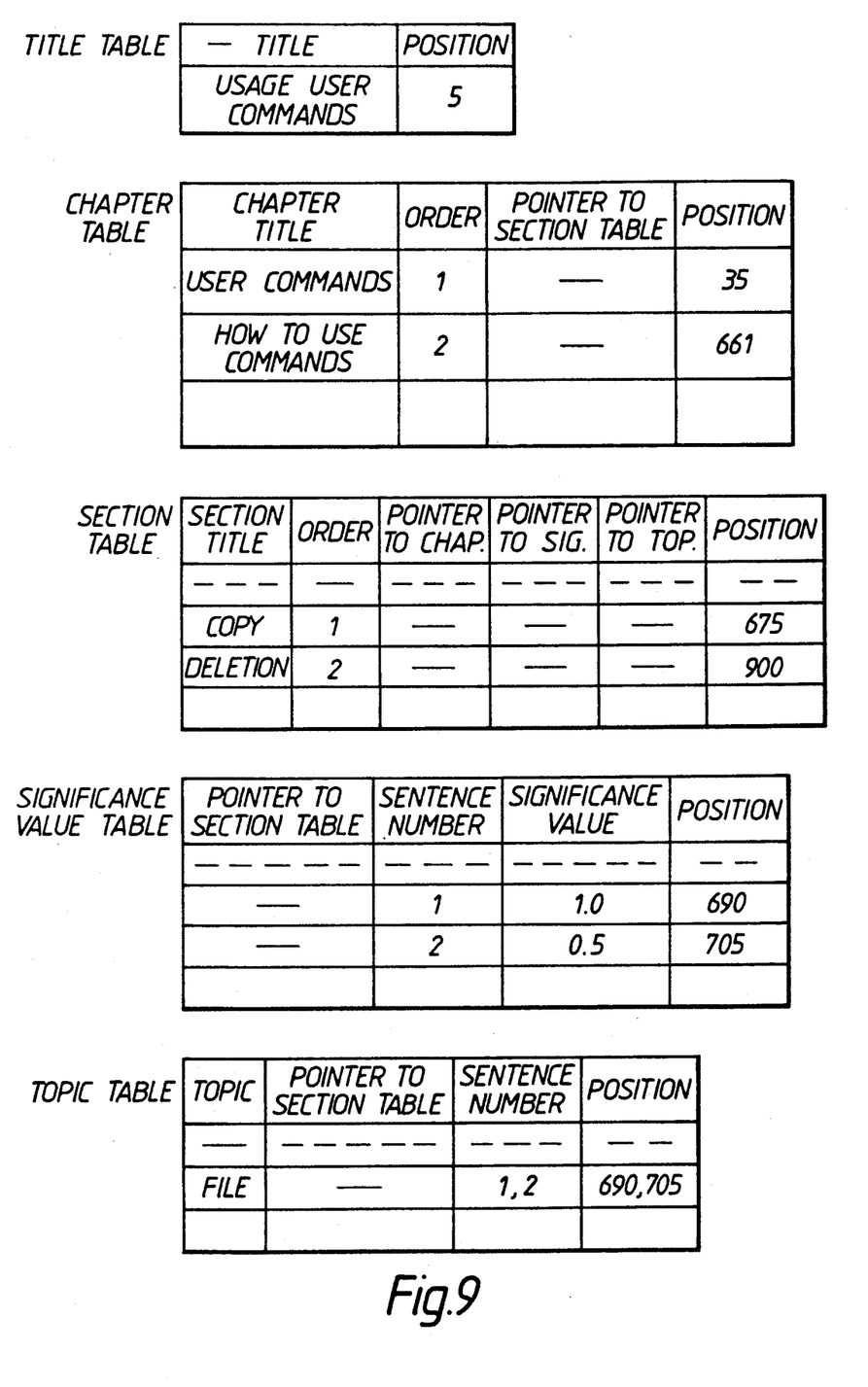
FIG. 9 shows a storage structure for document data, format structure, significance values and topics according to an embodiment of the present invention.

In FIG. 8, the significance value and topic of each sentence of section 2.1 in chapter 2 is displayed while the user is inputting the document data for section 2.2. Accordingly, by referring to the significance value and topic, the user can designate the retrieval of a previous sentence from section 2.1 he wishes to study. As a result, the user can supply document data for section 2.2 smoothly because he understands the content of the sentence from section 2.1 which he studied. The document data, format structure information, significance value and topic are stored in memory 16, e.g., in section 18, wherein the memory is formatted to include a title table, a chapter title table, a section title table, a significance value table, and a topic table. The formats for such tables are diagrammatically illustrated in FIG. 9. The information in these tables is referenced according to position and pointer values. The position value is defined with reference to the first character position of the corresponding title or sentence, which is counted from the first character of the document data. The section table stores the titles of the sequence of sections in a chapter including those sections. The significance value table stores sentence numbers corresponding to the significance values in a section including those sentences. The topic table stores sentence numbers including the topic in a section including those sentences.

Figure 10:
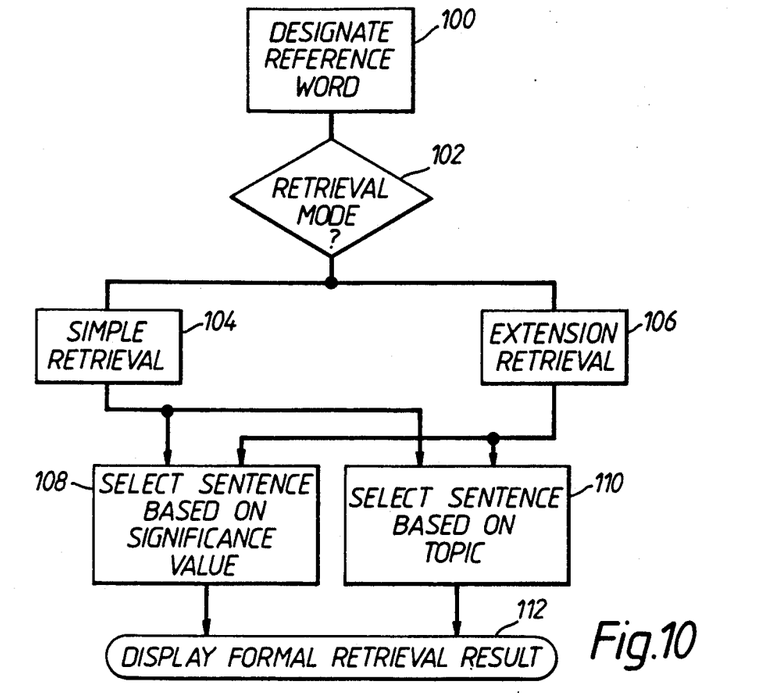
FIG. 10 shows a flow chart for retrieving a sentence from document data according to an embodiment of the present invention.

Next, the processing performed by sentence retrieval section 32 (FIG. 2) is explained. FIG. 10 shows a flow chart for retrieving sentences from document data according to an embodiment of the present invention. There are two kinds of retrieval mode, i.e., a simple retrieval mode and an extension retrieval mode. First, at step 100, the user designates a reference word, which serves as a retrieval key, through input section 12. For example, the user designates a reference word which is part of a displayed sentence by using a mouse. Alternatively, the user can enter a reference word by keyboard. At the same time, the user designates document data which is a retrieval object. The retrieval object is the portion of the document data from which a sentence is to be retrieved and can be the document data which the user most recently created and which is currently displayed.

After designating the reference word, the user selects the retrieval mode. In this regard, the user is preferably presented with a screen display offering a selection, e.g., by mouse, of either the simple or extension retrieval modes. It is first assumed that the user selects the simple retrieval mode (step 102). Then, at step 104, in the simple retrieval mode, sentence retrieval section 32 retrieves sentences which include the reference word from the document data which was previously identified by the user as the retrieval object. In accordance with the prior art, retrieval processing is complete at this point and the retrieved sentences are displayed. However, in accordance with the present invention, sentence retrieval section 32 evaluates the words of the retrieved sentences and selects the retrieved sentence containing a word that matches the reference word. To accomplish this, section 32 refers to significance values previously computed by section 24 and evaluates the significance value of each retrieved sentence in the document data. If the significance value of the retrieved sentence is higher than a predetermined value, section 32 selects the retrieved sentence as the formal retrieval result (step 108). Thus, section 32 selects each of the retrieved sentences having a sufficiently high significance value. Such a selection is based on the reasoning that a sentence whose significance value is high is closely related to the reference word. If the significance value of a retrieved sentence is lower than the predetermined value, section 32 abandons the retrieved sentence. Such a decision to abandon is based on the reasoning that a sentence whose significance value is low is not related to the reference word.

At step 110, section 32 refers to the topic of each sentence as previously determined by section 26. If the topic of the retrieved sentence matches the reference word, then section 32 selects the retrieved sentence as the formal retrieval result. Such a selection is based on the reasoning that a sentence whose topic is the reference word is closely related to the reference word. If the topic of the retrieved sentence does not match the reference word, then section 32 abandons the retrieved sentence. Such a decision to abandon is based on the reasoning that a sentence whose topic is not the reference word is not related to the reference word.

Figure 11:
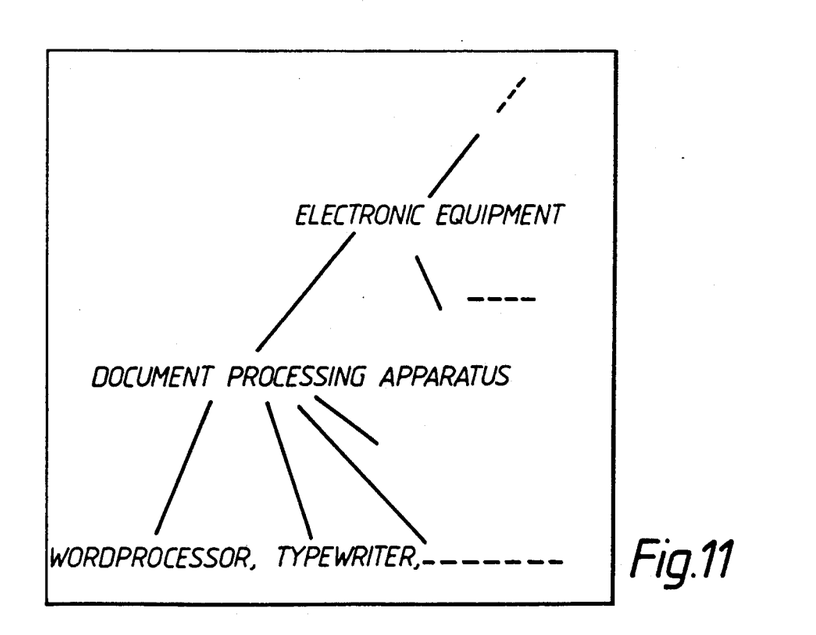
FIG. 11 shows an exemplary portion of a relational word dictionary.

When the user designates the reference word, sentence retrieval section 32 may use a relational word with the reference word. In such a case, the retrieval operation is referred to as an extension retrieval (step 106 in FIG. 10). In this case, section 32 refers to a previously prepared relational word dictionary. FIG. 11 illustrates an exemplary portion of such a relational word dictionary. By referring to the relational word dictionary, section 32 selects, if available, a high rank word, a low rank word and an equal rank word of the reference word as relational words. For example, as shown in FIG. 11, a high rank word of "document processing apparatus" is "electronic equipment." Low rank words of "document processing apparatus" are "wordprocessor", "typewriter" and so on. "Wordprocessor", and "typewriter" are equal rank words with respect to each other since, although those words are different, their meanings are substantially the same. If the user designates "document processing apparatus" as the reference word, section 32 selects "electronic equipment", "wordprocessor", and "typewriter" as relational words. In the case that at least one of these relational words appears in a sentence including the reference word or these relational words appear in a section consisting of several sentences of which one sentence including the reference word, section 32 retrieves the sentence including the reference word.

In the extension retrieval mode, sentence retrieval section 32 can also generate a relational word by converting the part of speech of the reference word. In this regard, if the reference word is a verb or an adjective, section 32 converts the reference word into a noun to create a relational word. For example, if the verb "think" is designated as the reference word, section 32 generates the noun "thought" as a relational word. If the adjective "beautiful" is designated as the reference word, section 32 generates the noun "beauty" as a relational word. Conversely, if the reference word is a noun, section 32 converts the reference word into a verb or an adjective to create a relational word. Section 32 retrieves, from the document data, sentences by using the relational words and the reference word. Then section 32 determines the formal retrieval result on the basis of either the previously determined significance values (step 108) or topics (step 110) of the retrieved sentences. CPU 14 causes the formal retrieval result determined by section 32 to be transmitted to output section 34 for display to the user, such as in a window adjacent to the document data, as shown in FIG. 8. (Step 112 in FIG. 10).

A document processing system can be constructed and operated in accordance with the present invention with the capability to perform either or both of steps 108 and 110. However, in the case where a system is constructed with the capability of performing both of steps 108 and 110, it is preferred that the user select one or the other of those steps for performance. This is preferred because if both steps are performed as part of the same retrieval operation, they may retrieve different sentences in response to the same reference word.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. Digital computing apparatus for preparing document text from document data input by a user, the document text including a series of sentences, said apparatus comprising:
   means for preparing document text from the document data input by the user; and
   sentence significance means for determining a significance value of each sentence of the series of sentences of the document text, according to a function of a determined relation between each sentence and the immediately preceding sentence in the series of sentences, wherein a predetermined word or phrase at the beginning of a sentence in the series of sentences is a connector of that sentence with respect to the immediately preceding sentence, said sentence significance means including
   means for assigning an initial significance value to each sentence in the series of sentences, and
   means for computing an updated significance value for each sentence in the series of sentences according to a function of the connector of the sentence and a current significance value of the immediately preceding sentence.

2. The digital computing apparatus of claim 1 further including:
   means for determining a format structure of the document text; and
   means for outputting the determined format structure including the significance value determined for each sentence of the series of sentences.

3. The digital computing apparatus of claim 2 wherein said output means comprises display means for simultaneously displaying to the user a predetermined portion of the document text and the determined format structure including the significance value determined for each sentence of the series of sentences.

4. The digital computing apparatus of claim 1 further including:
   input means for inputting document data from the user and for inputting from the user a reference word;
   means for retrieving from said document text each sentence of the series sentences that includes the reference word;
   means for selecting each one of the retrieved sentences whose determined significance value is higher than a predetermined significance value; and
   means for outputting each selected sentence to the user.

5. The digital computing apparatus of claim 4 wherein said output means comprises display means for simultaneously displaying to the user a predetermined portion of the document text and each selected sentence.

6. The digital computing apparatus of claim 4 further including means for determining a relational word that has a predetermined relationship to the reference word; and said retrieving means including means for retrieving from the document text each sentence of the series of sentences that includes the relational word.

7. The digital computing apparatus of claim 1 wherein said significance means further includes means for computing the respective updated significance values for the series of sentences at least two times in succession.

8. The digital computing apparatus of claim 1 wherein said significance means computes the updated significance value for each sentence in the series of sentences according to a function of the connector of an immediately succeeding sentence in the series of sentences and a current significance value of the immediately succeeding sentence.

9. The digital computing apparatus of claim 1 further including means for normalizing the respective updated significance values for the series of sentences.

10. Digital computing apparatus for preparing document text from document data input by a user, the document text including a series of sentences, said apparatus comprising:

means for preparing document text from the document data input by the user; and topic determining means for determining a topic of each sentence in the series of sentences of the document text, said topic determining means including means for identifying each noun in each of a first predetermined number of successive sentences of the document text, means for selecting from the identified nouns only those nouns that occur more than a second predetermined number of times in the successive sentences, means for deleting predetermined unnecessary nouns from the selected nouns thereby leaving remaining selected nouns, and means for determining that the topic is represented by the remaining selected nouns.

11. The digital computing apparatus of claim 10 further including:

means for determining a format structure of the document text; and means for outputting the determined format structure including the topic of each sentence of the series of sentences.

12. The digital computing apparatus of claim 11 wherein said output means comprises display means for simultaneously displaying to the user a predetermined portion of the document text and the determined format structure including the topic of each sentence of the series of sentences.

13. The digital computing apparatus of claim 10 further including:

input means for inputting document data from the user and for inputting from the user a reference word;

means for retrieving from said document text each sentence of the series of sentences that includes the reference word;

means for selecting the retrieved sentences having a topic which corresponds to the reference word; and means for outputting each selected sentence to the user.

14. The digital computing apparatus of claim 13 wherein said output means comprises display means for simultaneously displaying to the user a predetermined portion of the document text and each selected sentence.

15. The digital computing apparatus of claim 13 further including means for determining a relational word that has a predetermined relationship to the reference word; and said retrieving means including means for retrieving from said document text each sentence of the series of sentences that includes the relational word.

16. In a document processing system for preparing document text from document data input by a user, wherein the document text includes a series of sentences, a method for providing to the user information regarding document text, said method comprising the steps of:

inputting document data from the user;

preparing document text from the document data input by the user;

determining a significance value of each sentence of the series of sentences of the document text, according to a function of a determined relation between each sentence and the immediately preceding sentence in the series of sentences; and outputting to the user the determined significance values of the sentences;

wherein a predetermined word or phrase at the beginning of a sentence in the series of sentences is a connector of that sentence with respect to the immediately preceding sentence, and wherein said step of determining a significance value includes the substeps of assigning an initial significance value to each sentence in the series of sentences, and computing an updated significance value to each sentence in the series of sentences according to a function of the connector of the sentence and a current significance value of the immediately preceding sentence.

17. The method of claim 16 further including the step of determining a format structure of the document text; and said outputting step including the substep of outputting the determined format structure including the significance value of each sentence of the series of sentences.

18. The method of claim 16 further including the steps of:

inputting from the user a reference word;

retrieving from the document text each sentence of the series of sentences that includes the reference word; and selecting each of the retrieved sentences whose determined significance value is higher than a predetermined significance value;

said outputting step including the substep of outputting each selected sentence to the user.

19. The method of claim 18 further including the step of determining a relational word that has a predetermined relationship to the reference word; and said retrieving step including the substep of retrieving from the document text each sentence of the series of sentences that includes the relational word.

20. The method of claim 16 wherein said step of computing an updated significance value includes the substep of computing the respective updated significance values for the series of sentences at least two times in succession.

21. The method of claim 16 wherein the step of computing an updated significance value includes the substep of computing the updated significance value for each sentence according to a function of the connector of an immediately succeeding sentence in the series of sentences and a current significance value of the immediately succeeding sentence.

22. The method of claim 16 further including the step of normalizing the respective updated significance values for the series of sentences.

23. In a document processing system for preparing document text from document data input by a user, wherein the document text includes a series of sentences, a method for providing to the user information regarding the document text, said method comprising the steps of:

inputting document data from the user;

preparing document text from the document data input by the user;

determining a topic of each sentence in the series of sentences of the document text; and outputting to the user the determined topics of the sentences, wherein the topic determining step includes the substeps of identifying each noun in each of a first predetermined number of successive sentences, selecting from the identified nouns only those nouns that occur more than a second predetermined number of times in the successive sentences, deleting predetermined unnecessary nouns from the selected nouns thereby leaving remaining selected nouns, and determining that the topic is represented by the remaining selected nouns.

24. The method of claim 23 further including the step of determining a format structure of the document text; and said outputting step including the substep of outputting the determined format structure including the topic of each sentence of the series of sentences.

25. The method of claim 23 further including the steps of:

inputting from the user a reference word;

retrieving from the document text each sentence of the series of sentences that includes the reference word;

selecting the retrieved sentences having a topic which corresponds to the reference word; and said outputting step including the substep of outputting each selected sentence to the user.

26. The method of claim 25 further including the step of determining a relational word that has a predetermined relationship to the reference word; and said retrieving step including the substep of retrieving from said document text each sentence of the series of sentences that includes the relational word.

* * * * *